United States Patent
Dobeck

(10) Patent No.: US 7,404,397 B2
(45) Date of Patent: Jul. 29, 2008

(54) METHOD AND APPARATUS FOR MODIFYING FUEL INJECTION SCHEME

(75) Inventor: Michael V. Dobeck, Henderson, NV (US)

(73) Assignee: Total Fuel Systems, LLC, Las Vegas, NV (US)

( * ) Notice: Subject to any disclaimer, the term of this patent is extended or adjusted under 35 U.S.C. 154(b) by 0 days.

(21) Appl. No.: 11/518,007

(22) Filed: Sep. 7, 2006

(65) Prior Publication Data

US 2008/0060598 A1    Mar. 13, 2008

(51) Int. Cl.
 *F02D 41/14* (2006.01)
(52) U.S. Cl. ............... 123/672; 123/1 A; 123/575; 123/674; 701/109
(58) Field of Classification Search ............... 123/1 A, 123/575, 674, 675, 696, 672; 701/109
 See application file for complete search history.

(56) References Cited

U.S. PATENT DOCUMENTS

| | | | | | |
|---|---|---|---|---|---|
| 4,982,709 | A | * | 1/1991 | Oota | 123/1 A |
| 5,195,497 | A | * | 3/1993 | Yoshida et al. | 123/1 A |
| 5,197,450 | A | * | 3/1993 | Kitajima et al. | 123/1 A |
| 5,253,631 | A | * | 10/1993 | Curran | 123/1 A |
| 5,255,661 | A | * | 10/1993 | Nankee et al. | 123/674 |
| 5,335,637 | A | * | 8/1994 | Davis et al. | 123/478 |
| 5,365,917 | A | * | 11/1994 | Adams et al. | 123/491 |
| 5,467,755 | A | * | 11/1995 | Konrad et al. | 123/674 |
| 5,868,117 | A | * | 2/1999 | Moote et al. | 123/1 A |
| 5,881,703 | A | * | 3/1999 | Nankee et al. | 123/1 A |
| 5,937,798 | A | * | 8/1999 | Cheng et al. | 123/1 A |
| 5,950,599 | A | * | 9/1999 | Rotramel et al. | 123/1 A |
| 6,834,641 | B2 | | 12/2004 | Watanabe | 123/478 |
| 7,305,939 | B2 | * | 12/2007 | Carlson | 123/27 GE |
| 2003/0187567 | A1 | * | 10/2003 | Sulatisky et al. | 701/109 |
| 2005/0273246 | A1 | * | 12/2005 | Griese | 701/113 |

* cited by examiner

*Primary Examiner*—T. M Argenbright
(74) *Attorney, Agent, or Firm*—Weide & Miller, Ltd.

(57) ABSTRACT

A fuel injector control modification module is configured to modify primary fuel injector control signals provided by an engine control unit of an internal combustion engine. The module is particularly adapted to modifying fuel injector control signals based upon detected variations in fuel provided to the engine. Information indicative of fuel type is obtained by the module from an onboard diagnostic port associated with the engine control unit. The information may comprise fuel trim information which is generated, at least in part, from exhaust gas oxygen content information provided to the engine control unit. The module may modify or completely replace the primary fuel injector control signals at one or more times with secondary signal, such as to accommodate changes in fuel type. The module is particularly suited to addition to an existing engine to adapt the engine to run upon alternative fuels not contemplated by the original engine manufacturer.

14 Claims, 1 Drawing Sheet

METHOD AND APPARATUS FOR MODIFYING FUEL INJECTION SCHEME

FIELD OF THE INVENTION

The present invention relates to a method and apparatus for modifying a fuel injection scheme of an internal combustion engine.

BACKGROUND OF THE INVENTION

Many internal combustion engines now utilize one or more fuel injectors to deliver fuel for combustion. The time of the fuel delivery and the duration of fuel delivery by the fuel injectors are carefully controlled in order to achieve particular engine performance characteristics.

FIG. 1 illustrates an internal combustion engine E in accordance with the prior art. This engine E might be used, for example, to power an automobile or other vehicle.

Regardless of the type of engine E, the engine includes one or more combustion chambers. Fuel and air are provided to the one or more combustion chambers for combustion. Preferably, the fuel is delivered by one or more fuel injectors I. Fuel may be delivered by the one or more injectors I directly to each combustion chamber ("direct" injection) or to an air stream which is provided to each combustion chamber ("indirect" injection). As illustrated, there are four injectors I which are configured to deliver fuel directly to each of four combustion chambers.

Fuel is provided to each injector through a supply line FS, such as from a fuel tank T. Each fuel injector I is controlled by an engine control unit (ECU). The ECU generates control signals which are used to cause each injector I to deliver fuel at a particular time and for a particular duration. The fuel injectors I may be of a variety of types. In one embodiment, the fuel injectors I are energized when an appropriate "ground" signal is transmitted from the ECU which completes an energizing circuit. When the circuit including the fuel injector is energized, the fuel injector opens, allowing pressurized fuel to be delivered to the combustion chamber.

The ECU is programmed to implement a fuel injector control strategy. For example, the control strategy may be configured to optimize engine fuel efficiency. As indicated above, various combinations of injection timing and duration may be employed to achieve a particular performance characteristic for the engine.

One problem with this engine control configuration is that the fuel injection control strategy is fixed. In particular, the ECU is pre-programmed or includes a pre-configured fuel injector control "map." This pre-programmed control scheme is designed to implement a particular engine control strategy based upon one or more engine characteristics or factors. For example, the pre-programming is performed on the assumption that a particular fuel will be used with the engine, and based upon various engine operating parameters such as throttle position, system voltage, intake plenum air pressure, and engine speed, and may be optimized for a particular engine performance characteristic such as performance or fuel economy.

Such a pre-programmed fuel injector control strategy, however, has drawbacks. First, the strategy or scheme may not result in engine performance characteristics which match those of the user. For example, a user who uses their vehicle for towing rather than running city errands may desire to obtain maximum performance from the engine rather than maximum fuel efficiency.

In addition, the pre-programmed fuel injector control strategy does not account for variations in other external factors. For example, most motor vehicle manufacturers have developed their fuel injector control maps or control schemes based upon the assumption that the user will supply commercially available gasoline to the engine. However, motor vehicle operators have recently been offered the opportunity to use alternative fuels. One such fuel is E-85. This fuel comprises 85% ethanol and 15% gasoline.

As a result of the introduction of these other fuels, automobile manufacturers have realized that the fuel injection control strategy for an engine may need to be modified based upon the fuel which a user supplies to the engine. It is recognized that E-85 provides significantly less energy per volume of fuel than does gasoline. As such, in order to maintain the same engine operating condition, the fuel injection control strategy must be changed to increase fuel injection duration when E-85 fuel is used as compared to when regular gasoline is utilized. A further problem is introduced when considering that the vehicle operator may mix the fuels, such that the fuel which is being drawn from the tank is not E-85 or regular gasoline, but a mixture thereof.

The automobile manufacturer's solution to this problem is illustrated in FIG. 1. As illustrated, the ECU obtains information regarding the fuel which is being supplied to the engine E by a fuel tank sensor FTS. The fuel tank sensor FTS provides a signal to the ECU indicative of the nature of fuel in the tank. The ECU is pre-programmed with fuel injector control maps or schemes which account for variations in the composition of the fuel which is being provided to the engine, as indicated by the fuel tank sensor FTS.

This configuration, however, is expensive and requires that the ECU be pre-programmed "from the factory" by the manufacturer and requires the special fuel tank sensor. However, there are millions of vehicles already in use which do not include a fuel tank sensor and which do not have an ECU which is pre-programmed or mapped with fuel injector control schemes which are dependent upon differences in fuel which is supplied to the engine by the user. In such situations, either the user can not utilize alternative fuels, or if the user does use alternative fuels, the engine will not operate properly.

SUMMARY OF THE INVENTION

The invention is a fuel injector control modification apparatus and a method of modifying or altering a fuel injector control scheme of an internal combustion engine.

In one embodiment, the invention is a fuel injector control modification module. The module is adapted for use with an internal combustion engine having an engine control unit or other primary fuel injector control which generates primary fuel injector control signals. The module is configured to generate secondary fuel injector control signals which may be used, at one or more times, to replace or modify the primary fuel injector control signals.

In one embodiment, the module is configured to generate secondary fuel injector control signals based, at least in part, upon information indicative of a fuel being provided to the engine. Preferably, this information is determined indirectly. In particular, in a preferred embodiment, the module is configured to receive "fuel trim" information from the engine control unit (such as via an onboard diagnostic port associated with the engine control unit), which information is preferably generated, at least in part, from exhaust stream oxygen content information provided to the engine control unit. Such oxygen content information may be provided by one or more oxygen sensors. The fuel injector control modification module uses the "fuel trim" information to indirectly determine variations in the type of fuel being provided to the engine.

In one embodiment, a communication link extends between the module and the onboard diagnostic port over which the information is transmitted to the module. The link may be a cable with appropriate connectors.

Another embodiment of the invention is a method of modifying an engine with a fuel injector control modification module. In accordance with the method, the module is associated with an engine having an engine control unit or other primary fuel injector control which is configured to generate primary fuel injector control signals. Preferably, the control unit is configured to generate such primary fuel injector control signals based upon the assumption that a primary fuel type, such as commercial gasoline, will be provided to the engine.

A communication link is established between the module and the engine control unit, such as via an onboard diagnostic port, for receiving information indicative of a variation in fuel being provided to the engine. Preferably, this information comprises "fuel trim" information which is generated by the engine control unit based, at least in part, upon exhaust gas oxygen content information provided to the engine control unit. The module is configured to generate secondary fuel injector control signals which, at one or more times, modify or replace the primary fuel injector control signals.

Another aspect of the invention is a method of using a fuel injector control modification module to modify the fuel injector control scheme of an engine.

The invention has particular utility in modifying an existing engine which is configured to run on a particular fuel, such as commercial gasoline, so that it will operate using a variety of fuels, such as E-85 or mixtures of E-85 and commercial gasoline.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
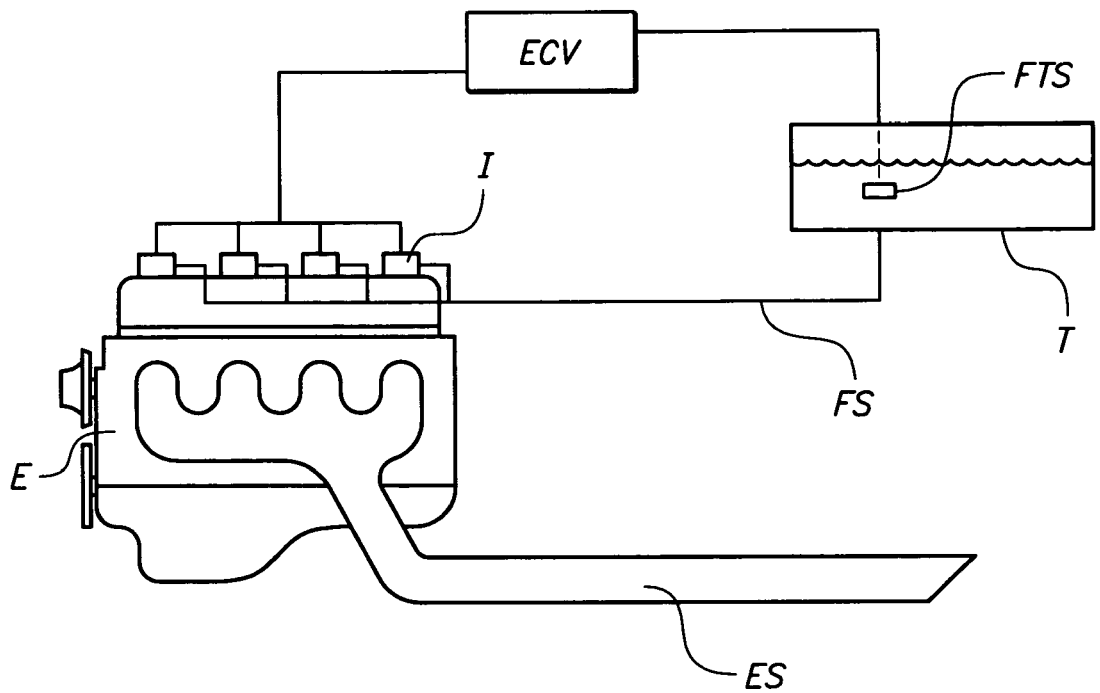
FIG. 1 illustrates one fuel injector control arrangement of a "from the factory" vehicle engine.
Figure 2:
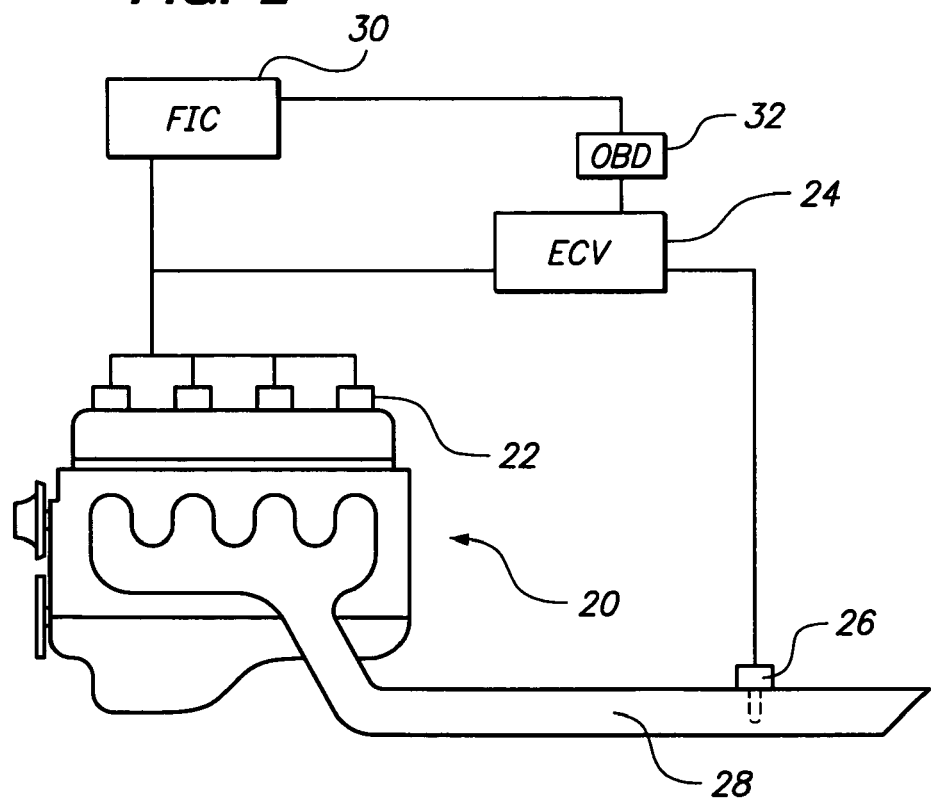
FIG. 2 illustrates an engine modified with a fuel injector control modification module in accordance with the present invention.

FIG. 2 illustrates an embodiment of an engine with a modified fuel injector control scheme. In general, the engine includes a fuel injector control modification module which is configured to modify the normal fuel injection scheme associated with an engine control unit of the engine.

FIG. 2 illustrates an engine 20 which is preferably of the internal combustion variety. The engine 20 may be of a variety of types or configurations, such as reciprocating piston or rotary. When the engine 20 is a reciprocating piston engine, the engine 20 may have any number of pistons, such as one or more. As illustrated, the engine 20 has four pistons arranged in an in-line configuration.

The engine 20 may operate in a variety of manners now known or later developed. Thus, in one configuration, each piston is preferably located in a cylinder and cooperates therewith to define a variable volume combustion chamber. Fuel and air are delivered to each combustion chamber for combustion. Combustion of the fuel within the cylinder effects movement of the piston which is also located in the cylinder. The one or more pistons are preferably connected to a crankshaft. The crankshaft may, in turn, be connected to an output shaft for driving (such as through an appropriate transmission), the wheels of a vehicle.

As illustrated, fuel is preferably delivered to the engine 20 for combustion by one or more fuel injectors 22. The one or more fuel injectors 22 are electronically operated. The one or more fuel injectors 22 may be configured to deliver fuel into air which is to be delivered to a combustion chamber (i.e. "indirect injection" where the fuel is introduced to air before it reaches the combustion chamber). As illustrated, however, the one or more fuel injectors 22 are configured to deliver fuel directly into the combustion chambers. As such, in the configuration in which there are four combustion chambers, there are four corresponding fuel injectors 22, each injector 22 configured to deliver fuel to a particular combustion chamber.

Fuel is preferably supplied to the one or more fuel injectors 22 via an appropriate fuel supply, as is well known to those of skill in the art. Such a fuel supply may comprise at least one fuel tank for storing fuel, one or more fuel delivery lines, and means for delivering fuel from the tank to the fuel injector(s), such as a mechanically or electrically powered pump. The fuel supply may also include appropriate filters and the like.

An engine control unit (ECU) 24 is configured to control one or more aspects of the operation of the engine 20. Preferably, the ECU 24 is configured to receive and process incoming data/signals, and to generate an output comprising one or more control signals. The ECU 24 may comprise hardware and/or software. For example, the ECU 24 may comprise a processing device and a memory for storing machine readable/executable instructions/code for execution by the processing device.

The ECU 24 may be configured to monitor and control various aspects of the operation of the engine 20, as is well known to those of ordinary skill in the art. In a preferred embodiment, the ECU 24 is pre-programmed to implement a particular fuel injection control scheme, such as by including a pre-defined fuel injector control "map" which defines fuel injection control based upon various parameters or variables. This scheme is applicable to a particular fuel or fuel type or range which is intended to be used with the engine. In a preferred embodiment, the ECU 24 is programmed for use with commercially available unleaded gasolines.

As illustrated, the ECU 24 is configured to receive information from at least one oxygen sensor 26 The ECU 24 may receive information from more than one such sensor. The oxygen sensor 26 is preferably associated with an exhaust system 28 of the engine 20. In this manner, the oxygen sensor 26 is configured to detect the oxygen content of an exhaust gas stream which is generated by the engine 20. The oxygen sensor 26 is preferably configured to output a signal to the ECU 24 which is indicative of the oxygen content of the exhaust stream.

The ECU 24 is configured to utilize the oxygen sensor 26 output in the control of the engine 20. The ECU 24 preferably receives the oxygen sensor 26 output and processes that data. The oxygen sensor 26 output may, for example, indicate a high oxygen content. Such a signal may be processed by the ECU 24 and cause the ECU 24 to increase the duration of fuel injection in order to make the fuel/air mixture more rich, so as to more closely achieve the stoichiometric ratio of fuel to air.

The ECU 24 generates primary fuel injector control signals, based upon its programming, which are used to cause the fuel injectors 22 to open and close at particular times. The timing of the activation of each fuel injector 22 and the duration of fuel injection is controlled in accordance with the predetermined mapping or scheme to achieve a particular engine operating characteristic.

Of course, the engine 20 includes a number of other components and systems, as is well known to those of ordinary skill in the art. For example, the engine 20 includes a plurality of spark plugs for initiating ignition of the fuel/air mixture in each combustion chamber. The engine 20 also includes an air intake system for providing air to the one or more combustion chambers. Such other components and systems are not described in detail herein, however, as they are not particularly relevant to the invention.

In accordance with one aspect of the invention, there is an apparatus for modifying the fuel injection scheme of an engine. As detailed below, in one embodiment, the apparatus comprises a fuel injector control modification module. Another aspect of the invention is a method of modifying an existing fuel injection scheme of an engine. Preferably, the apparatus and method are configured to modify the fuel injection scheme of an engine based upon variations in the fuel which is supplied to the engine.

FIG. 2 illustrates a fuel injector control modification module 30 for use in modifying the fuel injection scheme of an engine such as the engine 20 just described. In one embodiment, the fuel injector control modification module 30 comprises a secondary fuel injector control. The fuel injector modification module 30 is configured to receive information or data and generate one or more fuel injector control signals.

The fuel injector control modification module 30 may comprise hardware and/or software and may comprise a single device or element or a combination of elements or devices. In a preferred configuration, the fuel injector control modification module 30 comprises a micro-processor for processing signals or data provided thereto to generate secondary fuel injector control information and associated output signals. The fuel injector control modification module 30 may include a memory (such as RAM, ROM, DRAM, EPROM or the like) for storing a control map or other information for use by the processor.

In one embodiment, the fuel injector control modification module 30 is configured to, at one or more times, modify or override the primary fuel injector control provided by the ECU, in order to change the fuel injector control scheme from that which would be implemented by the ECU. In a preferred embodiment, the fuel injector control modification module 30 is configured to modify an existing fuel injector control scheme which is premised upon the supply of a particular fuel or fuels to the engine to accommodate the supply of different fuels to the engine.

In a preferred embodiment, the fuel injector control modification module 30 is provided information regarding the fuel which is being supplied to the engine 20. In a preferred configuration of the invention, the fuel injector control modification module 30 is configured to receive data or information from an onboard diagnostic (OBD) 32 associated with the ECU 24. As indicated above, the ECU 24 is configured to process data/signals to generate diagnostic information. This diagnostic information may be accessed through a port of the OBD 32. The port preferably comprise a connection by which a communication link may be formed with the OBD 32 to permit transmission of data from the OBD 32 to one or more other locations/devices.

As illustrated, a communication link is established between the OBD 32 and the fuel injector control modification module 30. This link may be cable which extends from a communication port of the fuel injector control modification module 30 to the communication port of the OBD 32. In this regard, the cable may include appropriate connector(s) for connection to the OBD 32 and/or module 30.

Preferably, the fuel injector control modification module 30 is connected to the OBD 32 so as to obtain information which is generated by the ECU 24 at least partially dependent upon the engine's exhaust stream oxygen content information (such as measured by the oxygen sensor 26). In a preferred embodiment, this information is preferably indirectly indicative of a type of fuel being provided to the engine 20. Though the engine 20 is not configured to directly measure fuel type, it has been determined that variations in the type of fuel provided to the engine affects the exhaust stream oxygen content. This oxygen content information, in turn, affects "fuel trim" data or information which is generated by the ECU 24 and which is available through the OBD 24. This "fuel trim" information may comprise, for example, a numerical value representing a "percentage of trim" as determined by the ECU 24. In one embodiment, this "fuel trim" information is provided to the fuel injector control modification module 30.

As indicated above, the fuel injector control modification module 30 is configured to generate, at one or more times, control signals which are used to control the fuel injectors 22. In one embodiment, the fuel injector control modification module 30 is configured to accept the primary fuel injection control signal(s) generated by the ECU 24. Depending upon variations in the type of fuel provided to the engine 20, as indicated by the "fuel trim" data received from the ECU 24 via the OBD 32, the fuel injector control modification module 30 is configured to modify the fuel injection scheme.

In one embodiment, when the primary fuel injection scheme needs modifying, the primary fuel injector control signals are entirely replaced with secondary control signals. For example, if the ECU 24 generates a primary fuel injection control signal representing a fuel injection opening time of 0.005 seconds, but the fuel injector control modification module 30 determines (based upon sensed fuel type) that the fuel injection duration should be 0.006 seconds, the fuel injector control modification module 30 generates a secondary fuel injector control signal (representative of a 0.006 second opening time) and that secondary signal is used (in replacement of the primary signal) to control the one or more fuel injectors.

In a preferred configuration, the fuel injector control modification module 30 modifies (rather than replaces) the primary fuel injector control signal(s). For example, in the above-reference example, instead of replacing the primary signal with a secondary signal, the fuel injector control modification module 30 may be configured to modify or alter the primary signal by extending it a sufficient duration to increase the fuel injection duration by 0.001 seconds.

A method of modifying the fuel injection scheme of an engine and a method of operating a modified engine will now be described. In a method of modifying an engine, a fuel injector control modification module is associated with an engine which has an existing or primary fuel injector control, such as an ECU. The fuel injector control modification module is connected (such as by a communication link) to the outboard diagnostic port or is otherwise associated with the ECU or other engine management/control device so as to obtain information which is indicative of a fuel being provided to the engine, such as "fuel trim" information which is generated by the ECU by processing exhaust stream oxygen content information. The fuel injector control modification module is configured, at one or more times, to generate fuel injector control signals. These signals, which may be referred to as "secondary" signals, may be configured to replace or alter the primary signals.

In a method of operation, the fuel injector control modification module receives information regarding the type of fuel which is being provided to the engine (as indicated above, in the form of "fuel trim" data which derived from the oxygen content of the engine exhaust stream). In the event of a fuel change, as such as a change in fuel from gasoline to E-85, the oxygen content of the exhaust stream will vary, thus changing the "fuel trim" data. As the fuel injector control modification module detects this change fuel as represented by changes in the "fuel trim" data, the fuel injector control modification module modifies the fuel injection scheme, such as by changing the duration of fuel injection from the primary duration as determined from the pre-programmed or mapped strategy associated with the ECU. This fuel injection control modifies the existing fuel injection control which is implemented by the ECU. For example, in the event the user supplies gasoline to the engine, the normal fuel injection scheme may be implemented by the existing ECU. However, in the event a user supplies E-85 rather than gasoline, the fuel injection control modification module will detect that a greater amount of fuel must be provided to the engine, and thus modify the fuel injection scheme (such as by increasing the duration of injector activation).

The invention has numerous advantages and solves a number of problems. First, the invention is a solution to adaption of existing vehicle engines to run upon fuels other than commercially available gasoline, such as E-85. In other words, the present invention permits the adaption of millions of existing engines which are pre-configured to run only upon gasoline so as to permit those engines to accept other types of fuels.

Second, the solution is economical and effective. As indicated, in order to permit newer vehicles to accept either gasoline or alternative fuels, some manufacturers are pre-programming their ECU's with a variety of maps and are equipping their vehicles with special fuel tank sensors. The present invention adapts an engine for use with such alternate fuels without the need for a special fuel tank sensor and without having to purchase a new ECU. As indicated, in the method of the invention, the fuel injector control modification module determines variations in supplied fuel "indirectly", i.e. not from direct information regarding fuel type, but from other information which is indicative of fuel type.

A particular advantage of the method and apparatus of the invention is that it ensures proper fuel injection control when the fuel which is supplied to the engine varies over time. For example, if the engine were configured to run on gasoline and it were then run on pure E-85, the fuel injector control modification module could be configured to simply increase the amount of fuel which is delivered in direct proportion to the decrease in energy value of E-85 to gasoline. This could be done by simply increasing the duration of fuel injection by a percentage which equals the percentage decrease in energy value of E-85 to gasoline.

However, a user will not necessarily always use one fuel or the other. For example, before the fuel tank is emptied of gasoline, a user may add E-85. This may cause the fuel composition in the tank to be essentially E-65 (65% ethanol and 35% gasoline). Similarly, the user may add gasoline to a partial tank of E-85. In accordance with the invention, the fuel injector control modification module is configured to modify the fuel injection control based upon differences in supplied fuel. In a preferred embodiment of the invention, changes in the composition of supplied fuel are indirectly detected from processed data supplied by the ECU to the onboard diagnostic. In this manner, the fuel injection strategy is continually modified (automatically, without user intervention) by the fuel injector control modification module based upon changes in the fuel which are delivered to the engine.

As is well known, EPA and other regulations govern the operation of engine, particularly as they relate to emissions generation. The engine control units of automobiles are programmed from the factory so that they operate in compliance with these emissions requirements. One particular advantage of this particular aspect of the invention (where the fuel injection scheme changes based upon supplied fuel) is that the engine can be run with alternative fuels and still maintain desired emission requirements.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of modifying the operation of one or more fuel injectors of an internal combustion engine based upon differences in fuel supplied to the engine, the engine having an engine control unit with a primary fuel injector control, at least one oxygen sensor providing exhaust gas oxygen content information to the engine control unit and an onboard diagnostic information port, comprising:
    providing a fuel injector control modification module comprising a secondary fuel injector control configured to generate fuel injector control signals;
    providing a communication link between said fuel injector control modification module and said onboard diagnostic information port;
    providing information indirectly indicative of a fuel being provided to said engine in the form of processed exhaust gas oxygen content information received by said fuel injector control modification module from said engine control unit through said onboard diagnostic information port via said communication link; and
    controlling the operation of said one or more fuel injectors at one or more times with fuel injector control signals generated by said secondary fuel injector control based upon the information indicative of the fuel being provided to said engine.

2. The method in accordance with claim 1 wherein said information which is indicative of a fuel being provided to said engine comprises fuel trim information.

3. The method in accordance with claim 1 wherein said fuel injector control signals generated by said secondary fuel injector control modify primary fuel injector control signals generated by said engine control unit.

4. The method in accordance with claim 1 wherein said fuel injector control signals generated by said secondary fuel injector control replace primary fuel injector control signals generated by said engine control unit.

5. The method in accordance with claim 1 wherein said fuel injector control modification module comprises a processor, at least one communication port for receiving information for use by said processor, and a memory configured to store information for use by said processor.

6. An internal combustion engine comprising:
    one or more fuel injectors;

an engine control unit configured to generate primary fuel injector control signals;

at least one oxygen sensor providing exhaust gas oxygen content information to the engine control unit;

an onboard diagnostic information port associated with said engine control unit;

a fuel injector control modification module linked via a communication link to said onboard diagnostic port, said fuel injector control modification module configured to generate secondary fuel injector control signals which at one or more times modify or replace said primary fuel injector control signals, said fuel injector control modification module configured to generate said secondary fuel injector control signals based at least in part upon information indicative of a fuel being provided to said engine in the form of an output received from through said onboard diagnostic information port from said engine control unit, which output is based at least in part upon processed oxygen content information provided by said at least one oxygen sensor.

7. The internal combustion engine in accordance with claim 6 wherein said information indicative of a fuel comprises fuel trim information.

8. The internal combustion engine in accordance with claim 7 wherein said fuel trim information comprises percentage trim data.

9. The internal combustion engine in accordance with claim 6 wherein said primary and secondary fuel injector control signals comprise ground signals for energizing a fuel injector for a duration of time.

10. The internal combustion engine in accordance with claim 6 wherein said fuel injector control modification module comprises a processor, at least one communication port and a memory.

11. A device for modifying the control of one or more fuel injectors of an internal combustion engine having an engine control unit configured to generate primary fuel injector control signals, at least one oxygen sensor providing exhaust gas oxygen content information to the engine control unit, and an onboard diagnostic information port, comprising:

a fuel injector control modification module configured to receive information indicative of variations in fuel provided to said engine in the form of a processed information output provided through said onboard diagnostic port by said engine control unit, which output is based at least partially upon said oxygen content information provided to said engine control unit, said fuel injector control modification module configured, at one or more times, to generate secondary fuel injector control signals.

12. The device in accordance with claim 11 wherein said fuel injector control modification module is configured to receive said primary fuel injector control signals and replace those primary signals with said secondary fuel injector control signals at one or more times.

13. The device in accordance with claim 11 wherein said fuel injector control modification module is configured to receive said primary fuel injector control signals and modify those signals with said secondary fuel injector control signals at one or more times.

14. The device in accordance with claim 11 wherein said fuel injector control modification module comprises a processor and a memory configured to store information for use by said processor.

* * * * *